Feb. 12, 1924.　　　　　1,483,631
J. W. FORBES
VALVE OPERATING MECHANISM
Filed April 25, 1923

Inventor
John W. Forbes
By his Attorneys
Blackmore, Spencer & Hulit

Patented Feb. 12, 1924.

1,483,631

UNITED STATES PATENT OFFICE.

JOHN W. FORBES, OF FLINT, MICHIGAN.

VALVE-OPERATING MECHANISM.

Application filed April 25, 1923. Serial No. 634,485.

*To all whom it may concern:*

Be it known that I, JOHN W. FORBES, a citizen of the United States, and a resident of Flint, county of Genesee, and State of Michigan, have invented certain new and useful Improvements in Valve-Operating Mechanisms, of which the following is a full, clear, concise, and exact description, such as will enable others skilled in the art to which the invention relates to make and use the same, reference being made therein to the accompanying drawings, which form a part of this specification.

This invention relates to means for opening and closing valves and is illustrated as embodied in a gate valve of a type in general use in steam plants. One great disadvantage of most valves with which I am familiar, and which are adapted for use in steam plants, is that they rely entirely on packing to keep them steam tight and consequently the steam must be entirely shut off whenever this packing has to be renewed. An important object of my invention is to provide a novel arrangement of the valve operating mechanism such that the valve is substantially steam tight whether or not packing is used, so that it may be used without packing if desired, and so that if packing is used as a further precaution it is not necessary to shut off the steam when the packing is renewed.

Having this object in mind, my invention may be regarded as contemplating the provision of a valve stem with a pair of spaced shoulders, and arranging an expansion chamber around the stem with seats for the shoulders at opposite ends of the chamber, so that any small amount of steam which may pass the first shoulder when it is against its seat will expand to such an extent that there is no substantial pressure tending to force it past the second shoulder. I prefer to provide a relief valve communicating with the described expansion chamber, so that the building up of any considerable pressure within the chamber may be prevented. If packing is used as a further precaution against the loss of steam (or other fluid), a seat for it may be provided about the stem beyond the expansion chamber, against which seat the packing may be compressed. By this arrangement, when the packing is to be renewed, even though the valve is wide open and there is a high steam pressure in the steam distributing system, it is entirely safe to relieve the compression on the packing, remove the old packing, and replace it with new packing. If the steam pressure is extremely high and it is desired to be absolutely safe, the above described relief valve may be opened at this time so that the expansion chamber is in communication with the outer air, whereupon the building up of any considerable pressure in the expansion chamber is entirely prevented and leakage of steam past the packing seat is prevented while the packing is being renewed.

The above and other features of the invention, including various novel combinations of parts and desirable particular constructions, will be apparent from the following description of an illustrative embodiment shown in the accompanying drawings, in which.

Figures 1, 2:
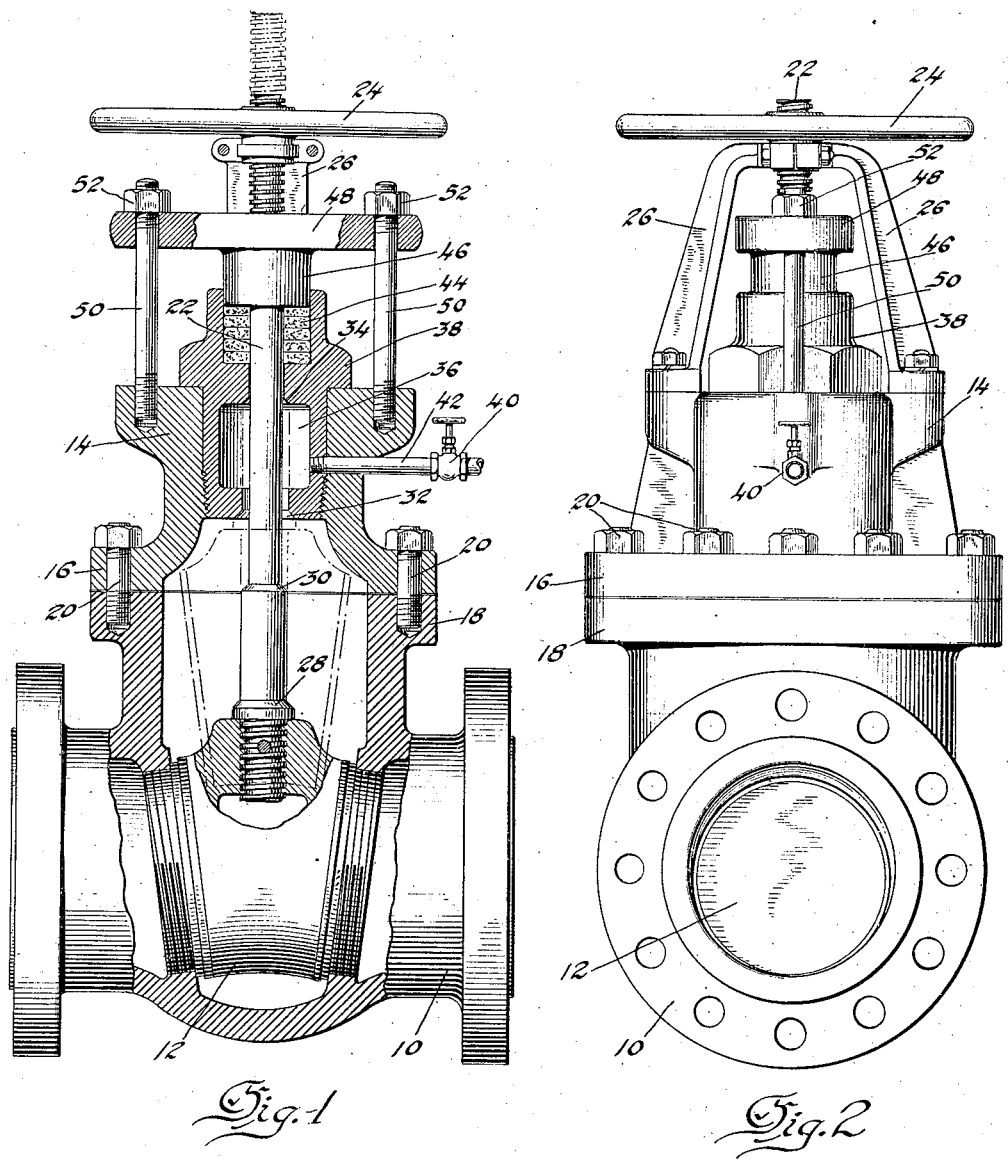
Figure 1 is a view of the valve in longitudinal vertical section.
Figure 2 is an end elevation thereof.

In the arrangement selected for illustration, the valve comprises a fitting 10 of any suitable character, which is provided with a seat for a valve member of any desired type, shown in the drawings as a gate 12. A support 14 is provided with a flange 16 secured to a flange 18 of the fitting 10 by bolts 20 or in any other desired manner.

According to the present invention the valve is operated by a stem 22, shown as being axially movable by having threaded on its upper end a hand wheel 24 held against motion of translation by a yoke 26 secured to the support 14. The stem is provided with spaced shoulders 28 and 30, arranged to seat when the valve is open against seats 32 and 34 provided at opposite ends of an expansion chamber 36 formed in a bushing 38 threaded into the support 14 and serving as a guide for the stem 22. Thus, as shown in dot and dash lines in Figure 1, when the valve is entirely open the shoulder 28 engages the seat 32 and the shoulder 30 engages the seat 34 so that there is substantially no leakage of steam (or other fluid) about the stem whether or not it is considered desirable to use packing. In order to prevent building up any considerable pressure in the expansion chamber 36, a relief valve 40 is provided which communicates with the expansion chamber through a short pipe 42 fitting in a hole in the support 14 and threaded through one wall of the expansion chamber 36 formed in bushing 38.

If it is desired to use packing to guard against any possibility of substantial leakage of steam under extremely high pressures, especially while the valve is being opened and closed, the bushing may be formed with a recess or seat in its upper end for packing 44 surrounding the stem, and which is compressed by an annular plunger 46 secured to or integral with a cross member 48 perforated at its opposite ends to fit over a pair of adjusting bolts 50 provided with nuts 52 which may be tightened to compress the packing.

In the use of the valve described above, when it becomes necessary to renew the packing 44, it is not necessary to shut off the steam or to readjust the valve in any way, as the shoulders 28 and 30 resting against their seats with the expansion chamber 36 between them effectively prevent the leakage of any steam about the valve stem. In fact, the higher the steam pressure, the more firmly the shoulders are forced against their seats. Thus the nuts 52 may be removed, the plunger 46 with its cross piece 48 moved upward sufficiently to permit the insertion of new packing, and the parts then replaced and tightened while the valve is in its open position. If it is desired to prevent any possibility of the development of considerable pressure in the expansion chamber 36 while this operation is being carried on, as in the case where the valve is used to control steam at very high pressures, the relief valve 40 may be opened so there cannot possibly develop any considerable pressure tending to force steam between the shoulder 30 and its seat 34.

While one embodiment of my invention has been illustrated and described, it is not my intention to limit its scope to that embodiment or otherwise than by the terms of the appended claims. The term "valve stem" used in the specification and claims is not intended as a limitation to any particular structure, but merely as a convenient designation for any member which is movable to open and close the valve proper.

I claim:

1. Valve operating mechanism comprising, in combination, an axially movable valve stem, and a guide therefor, the stem being provided with a pair of spaced shoulders, and the guide being provided with an expansion chamber surrounding the stem and with a pair of seats at opposite ends of the expansion chamber constructed and arranged to be engaged by said shoulders to act as spaced seals to prevent the escape of fluid from the valve when the valve is open.

2. Valve operating mechanism comprising, in combination, an axially movable valve stem, a guide therefor, the stem having a pair of spaced shoulders, the guide having an expansion chamber surrounding the stem and provided at its opposite ends with seats for said shoulders, and a relief valve communicating with the expansion chamber.

3. Valve operating mechanism comprising, in combination, an axially movable valve stem having a pair of spaced shoulders, a guide therefor having an expansion chamber surrounding the stem and a pair of seats at opposite ends of the expansion chamber to be engaged by the shoulders on the stem, and a packing confined about the stem on the opposite side of the expansion chamber from the valve.

4. Valve operating mechanism comprising, in combination, a valve stem having a pair of spaced shoulders, a stationary support, a valve stem guide secured to the support and having an expansion chamber surrounding the stem and a pair of seats for said shoulders at opposite ends of the expansion chamber, and mechanism mounted on the support for moving the stem axially to open and close the valve.

5. Valve operating mechanism comprising, in combination, an axially movable valve stem having a pair of spaced shoulders, a stationary support through which the stem passes, a bushing threaded into the support and having an expansion chamber surrounding the stem and a pair of seats for said shoulders at opposite ends of the expansion chamber and a seat for packing surrounding the stem beyond the expansion chamber, and means to compress packing in said seat.

6. Valve operating mechanism comprising, in combination, an axially movable valve stem having a pair of spaced shoulders, a stationary support through which the stem passes, a bushing threaded into the support and having an expansion chamber surrounding the stem and a pair of seats for said shoulders at opposite ends of the expansion chamber, and a relief valve passing through the support and communicating with the expansion chamber in the bushing.

7. Valve operating mechanism comprising, in combination, a movable valve stem, a guide having an expansion chamber surrounding the stem, the valve stem and guide being provided with coacting means to seal the spaces between the stem and guide at both ends of the expansion chamber, said coacting means being in position to be brought together by movement of the stem, and a relief valve communicating with the expansion chamber.

8. Valve operating mechanism comprising, in combination, a movable valve stem, a guide having an expansion chamber surrounding the stem, the valve stem and guide being provided with coacting means to seal the spaces between the stem and guide at both ends of the expansion chamber, said coacting means being in position to be brought together by movement of the stem, said guide also having a seat for packing beyond the expansion chamber, and a relief valve communicating with the expansion chamber to prevent the building up of pressure therein when new packing is being inserted on said seat.

9. A bushing for the described valve mechanism which is externally threaded and which has a central expansion chamber to surround a valve stem passing through the bushing, a seat for a shoulder on the valve stem at each end of the expansion chamber, and a recess or seat in its upper end to receive packing.

10. Valve operating mechanism comprising in combination, a support, a movable valve stem, a member carried by the support and provided with an expansion chamber surrounding the stem, the member and stem being provided with coacting means to seal the spaces between the stem and member at both ends of the expansion chamber, said coacting means being in position to be brought together by relative movement between the stem and member.

11. Valve operating mechanism comprising in combination, a support, an axially movable valve stem, a member carried by the support and provided with an expansion chamber surrounding the stem, the member and stem being provided with coacting surfaces to seal the spaces between the stem and member at points where the stem enters and leaves the expansion chamber, said coacting surfaces being brought together by relative axial movement between the member and stem.

12. Valve operating mechanism comprising in combination, a support, a movable valve stem, a member carried by the support and provided with an expansion chamber surrounding the stem, the stem having stepped shoulders, the member having a pair of seats spaced apart a distance corresponding to the distance apart of the shoulders and located at opposite sides of the expansion chamber and means for causing registry of the shoulders and seats to prevent the passage of fluid to or from the expansion chamber adjacent the stem.

In testimony whereof I affix my signature.

JOHN W. FORBES.